United States Patent
Zhang et al.

(10) Patent No.: US 10,013,165 B2
(45) Date of Patent: Jul. 3, 2018

(54) REMOTE MEMORY SWAPPING METHOD, APPARATUS AND SYSTEM

(71) Applicant: Huawei Technologies Co., Ltd., Shenzhen (CN)

(72) Inventors: Qianlong Zhang, Beijing (CN); Tao Jiang, Beijing (CN); Jianbo Dong, Beijing (CN); Yi Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 15/056,242

(22) Filed: Feb. 29, 2016

(65) Prior Publication Data

US 2016/0179391 A1    Jun. 23, 2016

Related U.S. Application Data

(63) Continuation of application No. PCT/CN2014/084195, filed on Aug. 12, 2014.

(30) Foreign Application Priority Data

Aug. 30, 2013  (CN) .......................... 2013 1 0391114

(51) Int. Cl.
*G06F 3/06* (2006.01)
*G06F 12/02* (2006.01)
(Continued)

(52) U.S. Cl.
CPC ............ *G06F 3/0604* (2013.01); *G06F 3/067* (2013.01); *G06F 3/0631* (2013.01);
(Continued)

(58) Field of Classification Search
CPC .... G06F 3/0604; G06F 3/0631; G06F 3/0644; G06F 3/067; G06F 3/0676
(Continued)

(56) References Cited

U.S. PATENT DOCUMENTS

2010/0332720 A1*  12/2010  Chang ................. G06F 9/45537
                                                              711/6
2011/0246597 A1   10/2011  Swanson et al.
(Continued)

FOREIGN PATENT DOCUMENTS

| CN | 1972215 A | 5/2007 |
|---|---|---|
| CN | 102223394 A | 10/2011 |
| WO | 2011002436 A1 | 1/2011 |

OTHER PUBLICATIONS

Foreign Communication From a Counterpart Application, European Application No. 14841161.4, Extended European Search Report dated Jun. 29, 2016, 7 pages.
(Continued)

*Primary Examiner* — Than Nguyen
(74) *Attorney, Agent, or Firm* — Conley Rose, P.C.

(57) ABSTRACT

A remote memory swapping method, an apparatus, and a system, that relate to the communications field and can improve a running speed of a system and reduce power consumption. The method, executed by a local node, includes obtaining a base address of a memory page that needs to be dumped; querying, according to the base address, a routing table to obtain routing information of the memory page; sending the routing information and dumping signaling to a cloud controller, so that the cloud controller forwards the routing information and the dumping signaling to a remote node in which the memory page is located; further, the remote node dumps, according to the dumping signaling and the routing information, from memory of the remote node into a hard disk of the remote node or the backward, data in the memory page.

19 Claims, 6 Drawing Sheets

(51) Int. Cl.
*G06F 12/084* (2016.01)
*G06F 12/126* (2016.01)
*G06F 15/167* (2006.01)
*G06F 9/50* (2006.01)

(52) U.S. Cl.
CPC .......... *G06F 3/0644* (2013.01); *G06F 3/0676* (2013.01); *G06F 9/50* (2013.01); *G06F 12/0223* (2013.01); *G06F 12/084* (2013.01); *G06F 12/126* (2013.01); *G06F 15/167* (2013.01); *Y02D 10/13* (2018.01)

(58) Field of Classification Search
USPC .......................................................... 711/159
See application file for complete search history.

(56) References Cited

U.S. PATENT DOCUMENTS

| | | | |
|---|---|---|---|
| 2012/0030406 A1* | 2/2012 | Chang .................. | G06F 9/5016 711/6 |
| 2012/0198030 A1 | 8/2012 | Wang et al. | |
| 2012/0317379 A1 | 12/2012 | Ali et al. | |
| 2014/0201302 A1 | 7/2014 | Dube et al. | |
| 2014/0258657 A1* | 9/2014 | Schott .................. | G06F 3/0608 711/162 |
| 2016/0196088 A1* | 7/2016 | Schott .................. | G06F 3/0608 707/639 |

OTHER PUBLICATIONS

Foreign Communication From a Counterpart Application, PCT Application No. PCT/CN2014/084195, English Translation of International Search Report dated Nov. 18, 2014, 2 pages.
Foreign Communication From a Counterpart Application, PCT Application No. PCT/CN2014/084195, English Translation of Written Opinion dated Nov. 18, 2014, 5 pages.
Machine Translation and Abstract of Chinese Publication No. CN1972215, May 30, 2007, 14 pages.
Foreign Communication From a Counterpart Application, Chinese Application No. 201310391114.9, Chinese Office Action dated Apr. 19, 2017, 5 pages.

\* cited by examiner

FIG. 10

REMOTE MEMORY SWAPPING METHOD, APPARATUS AND SYSTEM

CROSS-REFERENCE TO RELATED APPLICATIONS

This application is a continuation of International Application No. PCT/CN2014/084195, filed on Aug. 12, 2014, which claims priority to Chinese Patent Application No. 201310391114.9, filed on Aug. 30, 2013, both of which are hereby incorporated by reference in their entireties.

TECHNICAL FIELD

The present disclosure relates to the communications field, and in particular, to a remote memory swapping method, an apparatus, and a system.

BACKGROUND

In a cloud server platform, when memory of a node is insufficient, a borrow request may be sent to a cloud controller, so that the cloud controller allocates memory of another node to the node. In this way, the node borrows and uses the memory of the another node as memory of the node. Usually, a node that borrows memory is referred to as a local node, and a node from which the memory is borrowed is referred to as a remote node of the local node. After the local node borrows the memory of the remote node, memory of the local node includes local memory (memory of the local node itself) and remote memory (the memory of the remote node that the local node borrows).

If the memory of the local node is still not enough after the local node borrows the memory of the remote node, the local node may choose to swap out some data in the memory of the local node to a hard disk of the local node, so as to release some memory space. In a case in which the memory of the local node is insufficient, it is impossible to perform a swap out operation only on the local memory to release local memory space, because it is impossible that no swap out operation is performed on the memory of the remote node from borrowing to destruction. Once a swap out operation is performed on the remote memory, the following process needs to be performed.

The local node needs to scan the remote memory and select, according to a particular algorithm, memory page data that needs to be swapped out of the remote memory; then performs a swap out operation on the local memory, and dumps some memory data in the local memory of the local node into the hard disk of the local node, so as to reserve storage space for the memory page data that needs to be swapped out; and then sends, by using the cloud controller, a remote memory swap out command to the remote node in which the remote memory is located, so that the remote mode transmits, to the local node by using a transmission channel, the memory page data that needs to be swapped out, and the memory page data is stored in the storage space reserved by the local node; finally, the local node stores, in the hard disk of the local node, the memory page data that needs to be swapped out and is stored in the local memory.

In the foregoing process of performing the swap out operation on the remote memory by the cloud controller, some memory page data in the remote memory needs to be transmitted to the local node, which occupies the transmission channel, causes running of a system to slow down, and increases power consumption of the system. In addition, if the memory page data that needs to be swapped out of the remote node is transmitted back to the local node, in the local memory of the local node, storage space needs to be reserved for the memory page data that needs to be swapped out, which further increases pressure on the local memory and makes memory management more complex, and further causes the running of the system to slow down and increases the power consumption of the system.

SUMMARY

Embodiments of the present disclosure provide a remote memory swapping method, an apparatus, and a system, which can improve a running speed of a system and reduce power consumption.

To achieve the foregoing objective, the following technical solutions are provided in the embodiments of the present disclosure.

According to a first aspect, a remote memory swapping method is disclosed, including obtaining, by a local node, a base address of a memory page that needs to be dumped, and determining, according to the base address of the memory page that needs to be dumped, a node in which the memory page that needs to be dumped is located; when it is determined that the node in which the memory page that needs to be dumped is located is a remote node, querying, by the local node according to the base address of the memory page that needs to be dumped, a routing table to obtain routing information of the memory page that needs to be dumped; and sending, by the local node, the routing information of the memory page that needs to be dumped and dumping signaling to a cloud controller, so that the cloud controller forwards the routing information and the dumping signaling to the remote node in which the memory page that needs to be dumped is located.

In a possible design, the routing table stores routing information corresponding to a memory page. The memory page is in a node, the node comprises the local node and a remote node. The routing information includes a base address of the memory page, a node address in which the memory page is located, and a physical address of the memory page in the node. In a possible design, the routing table stores routing information corresponding to a memory page. The memory page is in a remote node. The routing information includes a base address of the memory page, a remote node address in which the memory page is located, and a physical address of the memory page in the remote node.

With reference to the first aspect, in a first possible implementation manner, the determining, by a local node according to the base address of the memory page that needs to be dumped, a node in which the memory page that needs to be dumped is located includes determining, by the local node according to address space in which the base address of the memory page that needs to be dumped is located, the node in which the memory page that needs to be dumped is located, where the local node prestores address space corresponding to the local node and address space corresponding to the remote node; or querying, by the local node, a page table to obtain identification information corresponding to the base address of the memory page that needs to be dumped, and determining the node in which the memory page that needs to be dumped is located, where the page table stores a base address of each memory page and identification information corresponding to the base address, and the identification information is used to identify a node corresponding to the base address.

According to a second aspect, a remote memory swapping method is disclosed, including invoking, by a remote node, a drive to listen to and receive dumping signaling and routing information that are sent by a cloud controller, where the routing information includes a base address of a memory page that needs to be dumped, a remote node address in which the memory page is located, and a physical address of the memory page in the remote node; and dumping, by the remote node from memory of the remote node into a hard disk of the remote node according to the dumping signaling and the routing information, data in the memory page that needs to be dumped, or dumping, from a hard disk of the remote node into memory of the remote node, data in the memory page that needs to be dumped.

With reference to the second aspect, in a first possible implementation manner, a remote memory swap partition is set in the hard disk of the remote node; the dumping, from memory of the remote node into a hard disk of the remote node, data in the memory page that needs to be dumped includes dumping, from the memory of the remote node into the remote memory swap partition of the hard disk of the remote node, the data in the memory page that needs to be dumped; and the dumping, from a hard disk of the remote node into memory of the remote node, data in the memory page that needs to be dumped includes dumping, from the remote memory swap partition of the hard disk of the remote node into the memory of the remote node, the data in the memory page that needs to be dumped.

According to a third aspect, a local node is disclosed, including a determining unit configured to obtain a base address of a memory page that needs to be dumped, and determine, according to the base address of the memory page that needs to be dumped, a node in which the memory page that needs to be dumped is located; a querying unit configured to, when the determining unit determines that the node in which the memory page that needs to be dumped is located is a remote node, query, according to the base address of the memory page that needs to be dumped, a routing table to obtain routing information of the memory page that needs to be dumped, where the routing table stores routing information corresponding to each memory page, and the routing information includes a base address of the memory page, a remote node address in which the memory page is located, and a physical address of the memory page in the remote node; and a sending unit configured to send the routing information that is obtained by querying by the querying unit and is of the memory page that needs to be dumped and dumping signaling to a cloud controller, so that the cloud controller forwards the routing information and the dumping signaling to the remote node in which the memory page that needs to be dumped is located.

With reference to the third aspect, in a first possible implementation manner, the determining unit is configured to determine, according to address space in which the base address of the memory page that needs to be dumped is located, the node in which the memory page that needs to be dumped is located, where the local node prestores address space corresponding to the local node and address space corresponding to the remote node; or the determining unit is configured to query a page table to obtain identification information corresponding to the base address of the memory page that needs to be dumped, and determine the node in which the memory page that needs to be dumped is located, where the page table stores a base address of each memory page and identification information corresponding to the base address, and the identification information is used to identify a node corresponding to the base address.

According to a fourth aspect, a remote node is disclosed, including a receiving unit configured to invoke a drive to listen to and receive dumping signaling and routing information that are sent by a cloud controller, where the routing information includes a base address of a memory page that needs to be dumped, a remote node address in which the memory page is located, and a physical address of the memory page in the remote node; and a dumping unit configured to dump, from memory of the remote node into a hard disk of the remote node according to the dumping signaling and the routing information that are received by the receiving unit, data in the memory page that needs to be dumped; or dump, from a hard disk of the remote node into memory of the remote node, data in the memory page that needs to be dumped.

With reference to the fourth aspect, in a first possible implementation manner, a remote memory swap partition is set in the hard disk of the remote node; the dumping unit is configured to dump, from the memory of the remote node into the remote memory swap partition of the hard disk of the remote node, the data in the memory page that needs to be dumped; or dump, from the remote memory swap partition of the hard disk of the remote node into the memory of the remote node, the data in the memory page that needs to be dumped.

According to a fifth aspect, a system is disclosed, including a local node, a cloud controller, and a remote node; where the local node is the foregoing local node; the cloud controller is configured to receive routing information that is sent by the local node and is of a memory page that needs to be dumped, and send the remote node the routing information of the memory page that needs to be dumped; and the remote node is the foregoing remote node.

According to the remote memory swapping method, the apparatus, and the system that are provided in the embodiments of the present disclosure, when a swap operation needs to be performed on remote memory, a local node sends dumping signaling to a remote node, so as to request the remote node to dump, into a hard disk of the remote node, data in a memory page that needs to be dumped or dump, from a hard disk of the remote node into memory of the remote node, data in a memory page that needs to be dumped. There is no need to occupy a transmission channel to transmit the data in the memory page of the remote node to the local node, and there is also no need to reserve, in local memory, space for the data that is in the remote memory page and is transmitted back. In this way, a running speed of a system can be improved, and power consumption can be reduced. In addition, a process of the method provided in the embodiments of the present disclosure is simple, and there is no need to modify memory management of a node.

DETAILED DESCRIPTION

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure shall fall within the protection scope of the present disclosure.

Embodiment 1

Figure 1:
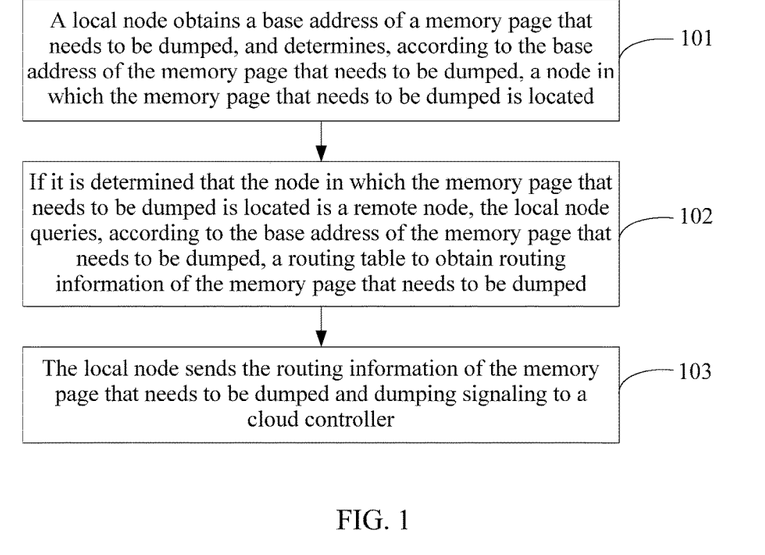
FIG. 1 is a schematic flowchart of a remote memory swapping method according to an embodiment of the present disclosure.

This embodiment of the present disclosure provides a remote memory swapping method. As shown in FIG. 1, when an entity for executing the method is a local node or is disposed in the local node, the method includes the following steps.

101. The local node obtains a base address of a memory page that needs to be dumped, and determines, according to the base address of the memory page that needs to be dumped, a node in which the memory page that needs to be dumped is located.

In a cloud server platform, when memory of a node is insufficient, memory of another node may be borrowed and used as memory of the node. Usually, a node that borrows memory is referred to as a local node, and a node from which the memory is borrowed is referred to as a remote node. After the local node borrows the memory of the remote node, memory of the local node includes local memory (memory of the local node itself) and remote memory (the memory of the remote node that the local node borrows).

The dumping herein may refer to swapping, out of the memory of the local node, data in the memory page that needs to be dumped, or refer to swapping the data in the memory page into the memory of the local node.

An operating system of the local node periodically (for example, every 10 seconds) scans the memory of the local node according to a particular algorithm, uses a memory page in which data that the operating system considers to be temporarily unnecessary is located as a memory page that needs to be swapped out, and instructs the local node to swap, out of the memory of the local node, the data in the memory page that needs to be swapped out, where the particular algorithm is generally a variant of a Least Recently Used (LRU) algorithm; or when a program needs to be run in the local node, but data corresponding to the program does not exist in the memory of the local node, that is, a page fault occurs, the operating system of the local node scans hard disks of the local node and the remote node to obtain a memory page in which the data corresponding to the program is located, uses the memory page as a memory page that needs to be swapped in, and instructs the local node to swap, into the memory of the local node, the data in the memory page that needs to be swapped in.

A memory management structure of the operating system of the local node stores a base address corresponding to each memory page. In this way, after obtaining the memory page that needs to be dumped (swapped in or swapped out), the operating system of the local node can obtain the base address of the memory page that needs to be dumped.

102. When it is determined that the node in which the memory page that needs to be dumped is located is a remote node, the local node queries, according to the base address of the memory page that needs to be dumped, a routing table to obtain routing information of the memory page that needs to be dumped.

The routing table stores routing information corresponding to each memory page, and the routing information includes a base address of the memory page, a remote node address in which the memory page is located, and a physical address of the memory page in the remote node.

If the local node determines that the node in which the memory page that needs to be dumped is located is the remote node, it indicates that a swap operation needs to be performed on remote memory. In this case, the local node may query, according to the base address of the memory page that needs to be dumped, the routing table to obtain the routing information of the memory page that needs to be dumped.

103. The local node sends the routing information of the memory page that needs to be dumped and dumping signaling to a cloud controller.

After obtaining the routing information of the memory page that needs to be dumped, the local node sends the routing information and the dumping signaling to the cloud controller, where the cloud controller can forward, according to a remote node address in the routing information of the memory page that needs to be dumped, the routing information of the memory page that needs to be dumped and the dumping signaling to the remote node in which the memory page that needs to be dumped is located. In this way, after receiving the dumping signaling and the routing information of the memory page that needs to be dumped, the remote node may dump, according to a physical address in the routing information of the memory page that needs to be dumped, the data in the memory page that needs to be dumped, and clears the data in the memory page that needs to be dumped.

If the physical address of the memory page that needs to be dumped is in the memory of the remote node, it indicates that a swap out operation needs to be performed, and the remote node swaps, out of the memory of the remote node, the data in the memory page that needs to be dumped, dumps, into a hard disk of the remote node, the data in the memory page that needs to be dumped, and clears the data in the memory page that needs to be dumped from the memory of the remote node. If the physical address of the memory page that needs to be dumped is in the hard disk of the remote node, it indicates that a swap in operation needs to be performed, and the data in the memory page that needs to be dumped is swapped from the hard disk of the remote node into the memory of the remote node, and the data in the memory page that needs to be dumped is cleared from the hard disk of the remote node. Herein, the memory of the remote node refers to memory that the local node borrows from the remote node.

Figure 2:
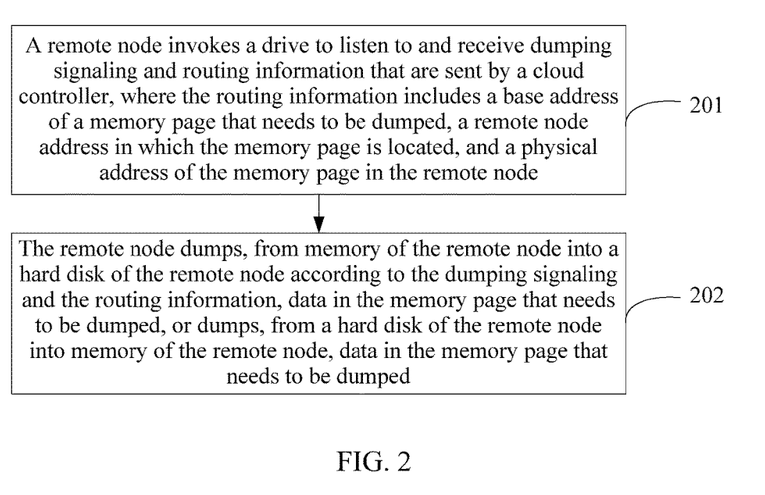
FIG. 2 is a schematic flowchart of another remote memory swapping method according to an embodiment of the present disclosure.

This embodiment of the present disclosure further provides a remote memory swapping method. As shown in FIG.

2, when an entity for executing the method is a remote node or is disposed in the remote node, the method includes the following steps.

201. The remote node invokes a drive to listen to and receive dumping signaling and routing information that are sent by a cloud controller, where the routing information includes a base address of a memory page that needs to be dumped, a remote node address in which the memory page is located, and a physical address of the memory page in the remote node.

In a running process, when a local node obtains the base address of the memory page that needs to be dumped, the local node may determine, according to the base address of the memory page that needs to be dumped, a node in which the memory page that needs to be dumped is located. If the local node determines that the node in which the memory page that needs to be dumped is located is the remote node, it indicates that a swap operation needs to be performed on remote memory. In this case, the local node may query, according to the base address of the memory page that needs to be dumped, a routing table to obtain routing information of the memory page that needs to be dumped. The routing table stores routing information corresponding to each memory page, and the routing information includes a base address of the memory page, a remote node address in which the memory page is located, and a physical address of the memory page in the remote node. After obtaining the routing information of the memory page that needs to be dumped, the local node sends the routing information and the dumping signaling to the cloud controller; after obtaining the routing information of the memory page that needs to be dumped and the dumping signaling, the cloud controller can forward, according to a remote node address in the routing information of the memory page that needs to be dumped, the routing information of the memory page that needs to be dumped and the dumping signaling to the remote node in which the memory page that needs to be dumped is located.

The remote node may invoke the drive to listen to information sent by the cloud controller; when listening to and detecting the routing information and the dumping signaling that are sent by the cloud controller, the remote node can immediately receive the routing information and the dumping signaling.

202. The remote node dumps, from memory of the remote node into a hard disk of the remote node according to the dumping signaling and the routing information, data in the memory page that needs to be dumped, or dumps, from a hard disk of the remote node into memory of the remote node, data in the memory page that needs to be dumped.

After receiving the dumping signaling, the remote node starts to perform a dumping operation. If the physical address that is in the routing information and is of the memory page that needs to be dumped is in the memory of the remote node, it indicates that a swap out operation needs to be performed, and the remote node swaps, out of the memory of the remote node, the data in the memory page that needs to be dumped, dumps, into a hard disk of the remote node, the data in the memory page that needs to be dumped, and clears the data in the memory page that needs to be dumped from the memory of the remote node. If the physical address of the memory page that needs to be dumped is in the hard disk of the remote node, it indicates that a swap in operation needs to be performed, and the remote node swaps, from the hard disk of the remote node into the memory of the remote node, the data in the memory page that needs to be dumped, and clears the data in the memory page that needs to be dumped from the hard disk of the remote node. Herein, the memory of the remote node refers to memory that the local node borrows from the remote node.

According to the remote memory swapping method provided in this embodiment of the present disclosure, when a swap operation needs to be performed on remote memory, a local node sends dumping signaling to a remote node, so as to request the remote node to dump, into a hard disk of the remote node, data in a memory page that needs to be dumped or dump, from a hard disk of the remote node into memory of the remote node, data in a memory page that needs to be dumped. There is no need to occupy a transmission channel to transmit the data in the memory page of the remote node to the local node, and there is also no need to reserve, in local memory, space for the data that is in the remote memory page and is transmitted back. In this way, a running speed of a system can be improved, and power consumption can be reduced. In addition, a process of the method provided in this embodiment of the present disclosure is simple, and there is no need to modify memory management of a node.

Embodiment 2

Figure 3:
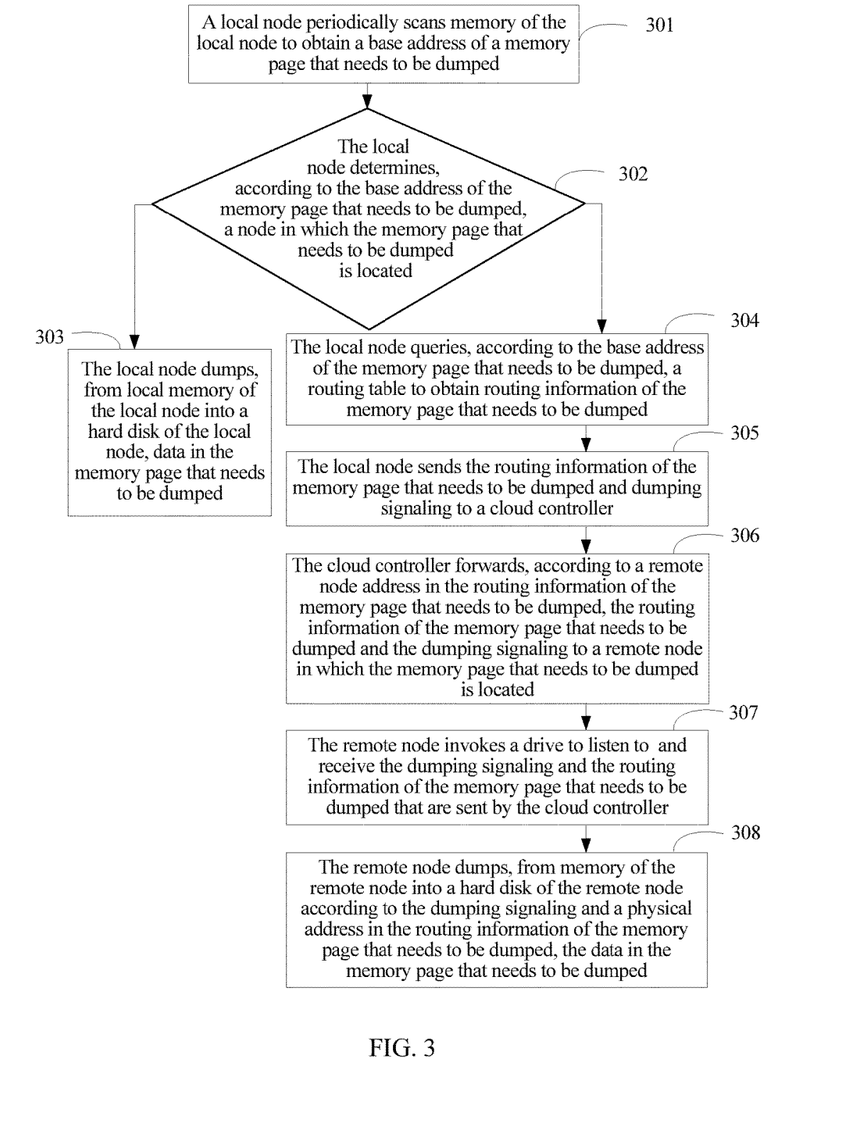
FIG. 3 is a schematic flowchart of another remote memory swapping method according to an embodiment of the present disclosure.

This embodiment of the present disclosure further provides a remote memory swapping method, where the method is a swap out method. As shown in FIG. 3, the method includes the following steps.

301. A local node periodically scans memory of the local node to obtain a base address of a memory page that needs to be dumped.

In a cloud server platform, when memory of a node is insufficient, memory of another node may be borrowed and used as memory of the node. Usually, a node that borrows memory is referred to as a local node, and a node from which the memory is borrowed is referred to as a remote node. After the local node borrows the memory of the remote node, memory of the local node includes local memory (memory of the local node itself) and remote memory (the memory of the remote node that the local node borrows).

An operating system of the local node periodically (for example, every 10 seconds) scans the memory of the local node according to a particular algorithm, and swaps and dumps, out of the memory of the local node, data that the operating system considers to be temporarily unnecessary, where the particular algorithm is generally a variant of LRU.

A memory management structure of the operating system of the local node stores a memory page corresponding to each piece of data and a base address corresponding to each memory page. In this way, after obtaining data that needs to be swapped out and dumped, the operating system of the local node can obtain the base address of the memory page that needs to be dumped.

302. The local node determines, according to the base address of the memory page that needs to be dumped, a node in which the memory page that needs to be dumped is located.

Herein, there are two methods for the local node to determine, according to the base address of the memory page that needs to be dumped, the node in which the memory page that needs to be dumped is located.

Method 1:

The local node determines, according to address space in which the base address of the memory page that needs to be dumped is located, the node in which the memory page that needs to be dumped is located, where the local node pre-stores address space corresponding to the local node and address space corresponding to the remote node.

The local node may perform a global arrangement on the memory (local memory and remote memory) of the local node. For example, a local node A borrows memory of a remote node B and a remote node C, and it is assumed that the local node A has 4 gigabyte (GB) local memory, and the local node A borrows 1 GB remote memory from the remote node B and 2 GB remote memory from the remote node C; then, the local node A performs a global arrangement on all the 7 GB memory, and address space corresponding to the 4 GB local memory of the local node A is 0-3 GB, address space corresponding to the 1 GB remote memory of the remote node B is 3-4 GB, and address space corresponding to the 2 GB remote memory of the remote node C is 4-6 GB. In this way, when the base address of the memory page that needs to be dumped is 0x0fff, it indicates that the address space in which the base address of the memory page that needs to be dumped is located is the address space corresponding to the local node A, and then, the local node A may determine that the node in which the memory page that needs to be dumped is located is the local node; when the base address of the memory page that needs to be dumped is 0x10000000f, it indicates that the address space in which the base address of the memory page that needs to be dumped is located is the address space corresponding to the remote node B, and then, the local node A can determine that the node in which the memory page that needs to be dumped is located is a remote node.

Method 2:

The local node queries a page table to obtain identification information corresponding to the base address of the memory page that needs to be dumped, and determines the node in which the memory page that needs to be dumped is located, where the page table stores a base address of each memory page and identification information corresponding to the base address, and the identification information is used to identify a node corresponding to the base address.

In the prior art, a local node stores a page table, and the page table stores a base address of each memory page in memory (local memory and remote memory) of the local node. In this embodiment of present disclosure, identification information is added to the page table to distinguish whether the base address of each memory page is corresponding to the local node or a remote node. For example, the identification information may be indicated by 0 and 1, where 0 indicates that the base address of the memory page is corresponding to the local node, and 1 indicates that the base address of the memory page is corresponding to the remote node.

If it is determined, by using the method 1 or the method 2 in step 302, that the node in which the memory page that needs to be dumped is located is the local node, step 303 is to be performed; if it is determined that the node in which the memory page that needs to be dumped is located is the remote node, step 304 is to be performed.

303. The local node dumps, from local memory of the local node into a hard disk of the local node, data in the memory page that needs to be dumped.

If the node in which the memory page that needs to be dumped is located is the local node, the local node can directly perform a swap out operation on the local memory, swap, out of the local memory of the local node, the data in the memory page that needs to be dumped, dump, into the hard disk of the local node, the data in the memory page that needs to be dumped, and clear the data in the memory page that needs to be dumped from the local memory of the local node.

Optionally, a memory swap partition may be set in the hard disk of the local node. In this way, the data in the memory page that needs to be dumped can be dumped into the memory swap partition of the hard disk of the local node. A memory swap partition is set in the hard disk and is dedicated to storing data that is in a memory page and is swapped out of the memory, which may be separated from a data area in the hard disk of the local node, so as to ensure security of data in the hard disk.

304. The local node queries, according to the base address of the memory page that needs to be dumped, a routing table to obtain routing information of the memory page that needs to be dumped.

If the local node determines that the node in which the memory page that needs to be dumped is located is the remote node, it indicates that a swap out operation needs to be performed on the remote memory. In this case, the local node may query, according to the base address of the memory page that needs to be dumped, the routing table to obtain the routing information of the memory page that needs to be dumped. The routing table stores routing information corresponding to each memory page, and the routing information includes a base address of the memory page, a remote node address in which the memory page is located, and a physical address of the memory page in the remote node.

305. The local node sends the routing information of the memory page that needs to be dumped and dumping signaling to a cloud controller.

Herein, the routing information may be carried in the dumping signaling to be sent to the cloud controller; or the dumping signaling may be first sent to the cloud controller, and then the routing information is sent.

The dumping signaling herein may be swap out dumping signaling.

306. The cloud controller forwards, according to a remote node address in the routing information of the memory page that needs to be dumped, the routing information of the memory page that needs to be dumped and the dumping signaling to a remote node in which the memory page that needs to be dumped is located.

307. The remote node invokes a drive to listen to and receive the dumping signaling and the routing information of the memory page that needs to be dumped that are sent by the cloud controller.

The remote node may invoke the drive to listen to information sent by the cloud controller; when listening to and detecting the dumping signaling and the routing information that are sent by the cloud controller, the remote node can immediately receive the dumping signaling and the routing information. The routing information of the memory page that needs to be dumped includes the base address of the memory page that needs to be dumped, the remote node address in which the memory page is located, and a physical address of the memory page in the remote node.

308. The remote node dumps, from memory of the remote node into a hard disk of the remote node according to the dumping signaling and a physical address in the routing information of the memory page that needs to be dumped, the data in the memory page that needs to be dumped.

After receiving the dumping signaling, the remote node starts to perform a dumping operation. If the physical address that is in the routing information and is of the memory page that needs to be dumped is in the memory of the remote node, it indicates that a swap out operation needs to be performed, and the remote node swaps, out of the remote memory, the data in the memory page that needs to be dumped, dumps, into the hard disk of the remote node, the data in the memory page that needs to be dumped, and clears the data in the memory page that needs to be dumped. Herein, the memory of the remote node refers to memory that the local node borrows from the remote node.

Optionally, a remote memory swap partition may be set in the hard disk of the remote node; then, dumping, from memory of the remote node into a hard disk of the remote node, data in the memory page that needs to be dumped includes dumping, from the memory of the remote node into the remote memory swap partition of the hard disk of the remote node, the data in the memory page that needs to be dumped. In this way, a remote memory swap partition is set in the hard disk and is dedicated to storing data that is in a memory page and needs to be swapped out of the memory, which may be separated from a data area in the hard disk of the remote node, so as to ensure security of data.

Optionally, the dumping signaling may be the swap out dumping signaling. In this way, after receiving the dumping signaling, the remote node learns that data needs to be swapped out of the memory of the remote node, and the remote node swaps, out of the memory of the remote node according to the physical address that is in the routing information and is of the memory page that needs to be dumped, the data in the memory page that needs to be dumped, dumps, into the hard disk of the remote node, the data in the memory page that needs to be dumped, and clears the data in the memory page that needs to be dumped from the memory of the remote node.

Herein, the memory of the remote node refers to memory that the local node borrows from the remote node.

After dumping, into the hard disk of the remote node, the data in the memory page that needs to be dumped, the remote node may send, to the local node by using the cloud controller, a message indicating that the dumping is successful, so as to notify the local node that the dumping is successful.

Figure 4:
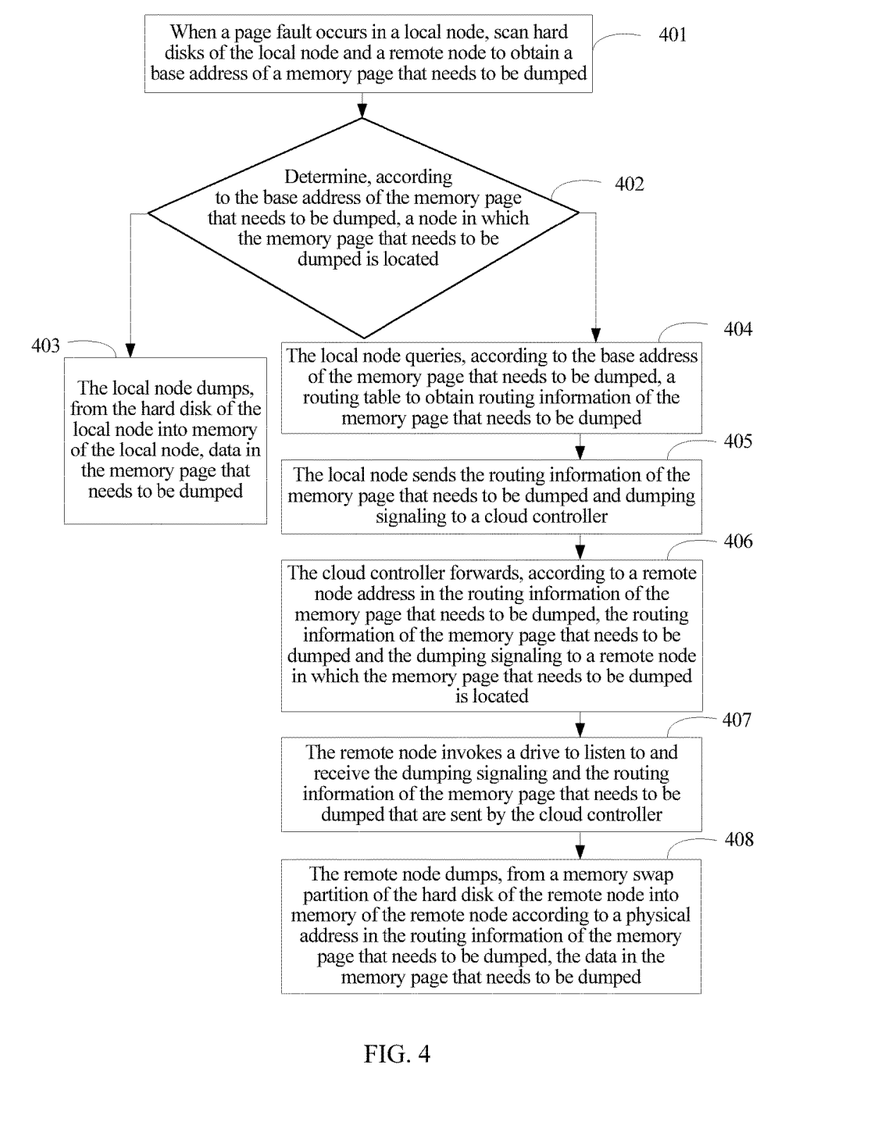
FIG. 4 is a schematic flowchart of another remote memory swapping method according to an embodiment of the present disclosure.

This embodiment of the present disclosure further provides a remote memory swapping method, where the method is a swap in method. As shown in FIG. 4, the method includes the following steps.

401. When a page fault occurs in a local node, scan hard disks of the local node and a remote node to obtain a base address of a memory page that needs to be dumped.

In a cloud server platform, when memory of a node is insufficient, memory of another node may be borrowed and used as memory of the node. Usually, a node that borrows memory is referred to as a local node, and a node from which the memory is borrowed is referred to as a remote node. After the local node borrows the memory of the remote node, memory of the local node includes local memory (memory of the local node itself) and remote memory (the memory of the remote node that the local node borrows).

When a program needs to be run in the local node, but data corresponding to the program does not exist in memory of the local node, that is, a page fault occurs, an operating system of the local node scans data in the hard disks of the local node and the remote node to obtain the data corresponding to the program.

A memory management structure of the operating system of the local node stores a memory page corresponding to each piece of data and a base address corresponding to each memory page. In this way, after obtaining data that needs to be swapped out and dumped, the operating system of the local node can obtain the base address of the memory page that needs to be dumped.

402. Determine, according to the base address of the memory page that needs to be dumped, a node in which the memory page that needs to be dumped is located.

Herein, there are two methods for the local node to determine, according to the base address of the memory page that needs to be dumped, the node in which the memory page that needs to be dumped is located.

Method 1:

The local node determines, according to address space in which the base address of the memory page that needs to be dumped is located, the node in which the memory page that needs to be dumped is located, where the local node pre-stores address space corresponding to the local node and address space corresponding to the remote node.

Method 2:

The local node queries a page table to obtain identification information corresponding to the base address of the memory page that needs to be dumped, and determines the node in which the memory page that needs to be dumped is located, where the page table stores a base address of each memory page and identification information corresponding to the base address, and the identification information is used to identify a node corresponding to the base address.

If it is determined, by using the method 1 or the method 2 in step 402, that the node in which the memory page that needs to be dumped is located is the local node, step 403 is to be performed; if it is determined that the node in which the memory page that needs to be dumped is located is the remote node, step 404 is to be performed.

403. The local node dumps, from the hard disk of the local node into memory of the local node, data in the memory page that needs to be dumped.

If the node in which the memory page that needs to be dumped is located is the local node, the local node can directly perform a swap in operation on the local memory, and dump, from the hard disk of the local node into the memory of the local node, the data in the memory page that needs to be dumped.

Optionally, a memory swap partition may be set in the hard disk of the local node. In this way, the data in the memory page that needs to be dumped may be dumped from the memory swap partition of the hard disk of the local node into the memory of the local node. A memory swap partition is set in the hard disk and is dedicated to storing data that is in a memory page and needs to be swapped out of the memory, which may be separated from a data area in the hard disk of the local node, so as to ensure security of data in the hard disk.

404. The local node queries, according to the base address of the memory page that needs to be dumped, a routing table to obtain routing information of the memory page that needs to be dumped.

The routing table stores routing information corresponding to each memory page, and the routing information includes a base address of the memory page, a remote node address in which the memory page is located, and a physical address of the memory page in the remote node.

405. The local node sends the routing information of the memory page that needs to be dumped and dumping signaling to a cloud controller.

Herein, the routing information may be carried in the dumping signaling to be sent to the cloud controller; or the dumping signaling may be first sent to the cloud controller, and then the routing information is sent.

The dumping signaling herein may be swap in dumping signaling.

406. The cloud controller forwards, according to a remote node address in the routing information of the memory page that needs to be dumped, the routing information of the memory page that needs to be dumped and the dumping signaling to a remote node in which the memory page that needs to be dumped is located.

407. The remote node invokes a drive to listen to and receive the dumping signaling and the routing information of the memory page that needs to be dumped that are sent by the cloud controller.

The routing information of the memory page that needs to be dumped includes the base address of the memory page that needs to be dumped, the remote node address in which the memory page is located, and a physical address of the memory page in the remote node.

408. The remote node dumps, from a memory swap partition of the hard disk of the remote node into memory of the remote node according to a physical address in the routing information of the memory page that needs to be dumped, the data in the memory page that needs to be dumped.

After receiving the dumping signaling, the remote node starts to perform a dumping operation. If the physical address that is in the routing information and is of the memory page that needs to be dumped is in the hard disk of the remote node, it indicates that a swap in operation needs to be performed, and the remote node swaps, out of the hard disk of the remote node, the data in the memory page that needs to be dumped, dumps, into the remote memory that the local node borrows from the remote node, the data in the memory that needs to be dumped, and clears the data in the memory page that needs to be dumped from the hard disk of the remote node. Herein, the memory of the remote node refers to memory that the local node borrows from the remote node.

Optionally, a remote memory swap partition may be set in the hard disk of the remote node; then, dumping, from a hard disk of the remote node into memory of the remote node, data in the memory page that needs to be dumped includes dumping, from the remote memory swap partition of the hard disk of the remote node into the memory of the remote node, the data in the memory page that needs to be dumped. In this way, a remote memory swap partition is set in the hard disk and is dedicated to storing data that is in a memory page and needs to be swapped out of the memory, which may be separated from a data area in the hard disk of the remote node, so as to ensure security of data.

After dumping, from the hard disk of the remote node into the memory of the remote node, the data in the memory page that needs to be dumped, the remote node may send, to the local node by using the cloud controller, a message indicating that the dumping is successful, so as to notify the local node that the dumping is successful.

According to the remote memory swapping method provided in this embodiment of the present disclosure, when a swap operation needs to be performed on remote memory, a local node sends dumping signaling to a remote node, so as to request the remote node to dump, into a hard disk of the remote node, data in a memory page that needs to be dumped or dump, from a hard disk of the remote node into memory of the remote node, data in a memory page that needs to be dumped. There is no need to occupy a transmission channel to transmit the data in the memory page of the remote node to the local node, and there is also no need to reserve, in local memory, space for the data that is in the remote memory page and is transmitted back. In this way, a running speed of a system can be improved, and power consumption can be reduced. In addition, a process of the method provided in this embodiment of the present disclosure is simple, and there is no need to modify memory management of a node.

Embodiment 3

Figure 5:
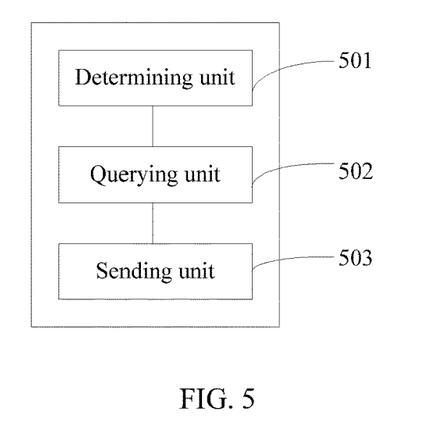
FIG. 5 is a structural block diagram of a local node according to an embodiment of the present disclosure.

This embodiment of the present disclosure further provides a local node. As shown in FIG. 5, the local node includes a determining unit 501, a querying unit 502, and a sending unit 503.

The determining unit 501 is configured to obtain a base address of a memory page that needs to be dumped, and determine, according to the base address of the memory page that needs to be dumped, a node in which the memory page that needs to be dumped is located.

The querying unit 502 is configured to, when the determining unit 501 determines that the node in which the memory page that needs to be dumped is located is a remote node, query, according to the base address of the memory page that needs to be dumped, a routing table to obtain routing information of the memory page that needs to be dumped, where the routing table stores routing information corresponding to each memory page, and the routing information includes a base address of the memory page, a remote node address in which the memory page is located, and a physical address of the memory page in the remote node.

The sending unit 503 is configured to send the routing information that is obtained by querying by the querying unit 502 and is of the memory page that needs to be dumped and dumping signaling to a cloud controller, so that the cloud controller forwards the routing information and the dumping signaling to the remote node in which the memory page that needs to be dumped is located.

Optionally, the determining unit 501 is configured to determine, according to address space in which the base address of the memory page that needs to be dumped is located, the node in which the memory page that needs to be dumped is located, where the local node prestores address space corresponding to the local node and address space corresponding to the remote node; or the determining unit 501 is configured to query a page table to obtain identification information corresponding to the base address of the memory page that needs to be dumped, and determine the node in which the memory page that needs to be dumped is located, where the page table stores a base address of each memory page and identification information corresponding to the base address, and the identification information is used to identify a node corresponding to the base address.

Figure 6:
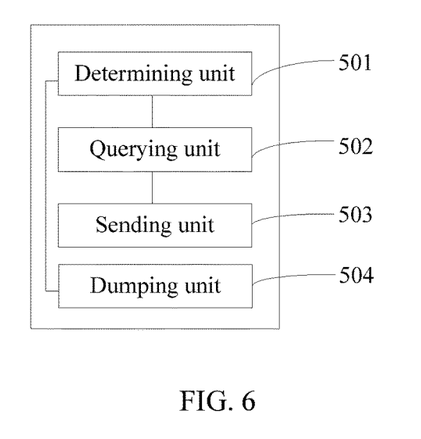
FIG. 6 is a structural block diagram of another local node according to an embodiment of the present disclosure.

Further, as shown in FIG. 6, the local node further includes a dumping unit 504.

The dumping unit 504 is configured to, when the determining unit 503 determines that the node in which the memory page that needs to be dumped is located is the local node, dump, from local memory of the local node into a hard disk of the local node, data in the memory page that needs to be dumped; or the dumping unit 504 is configured to, when the determining unit 503 determines that the node in which the memory page that needs to be dumped is located is the local node, dump, from a hard disk of the local node into local memory of the local node, data in the memory page that needs to be dumped.

Optionally, a memory swap partition is set in the hard disk of the local node; the dumping unit 504 is configured to dump, from the local memory of the local node into the memory swap partition of the hard disk of the local node, the data in the memory page that needs to be dumped; or the dumping unit 504 is configured to dump, from the memory swap partition of the hard disk of the local node into the local memory of the local node, the data in the memory page that needs to be dumped.

Figure 7:
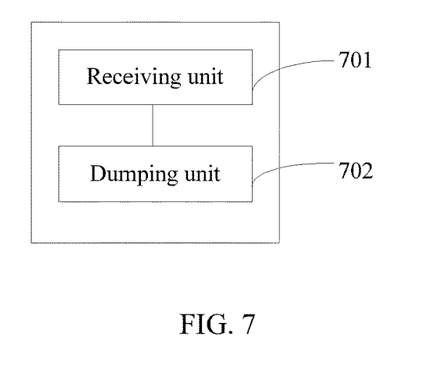
FIG. 7 is a structural block diagram of a remote node according to an embodiment of the present disclosure.

This embodiment of the present disclosure further provides a remote node, as shown in FIG. 7, including a receiving unit 701 and a dumping unit 702.

The receiving unit 701 is configured to invoke a drive to listen to and receive dumping signaling and routing information that are sent by a cloud controller, where the routing information includes a base address of a memory page that needs to be dumped, a remote node address in which the memory page is located, and a physical address of the memory page in the remote node.

The dumping unit 702 is configured to dump, from memory of the remote node into a hard disk of the remote node according to the dumping signaling and the routing information that are received by the receiving unit 701, data in the memory page that needs to be dumped; or dump, from a hard disk of the remote node into memory of the remote node, data in the memory page that needs to be dumped.

Optionally, a remote memory swap partition is set in the hard disk of the remote node; the dumping unit 702 is configured to dump, from the memory of the remote node into the remote memory swap partition of the hard disk of the remote node, the data in the memory page that needs to be dumped; or dump, from the remote memory swap partition of the hard disk of the remote node into the memory of the remote node, the data in the memory page that needs to be dumped.

Herein, the memory of the remote node refers to memory that the local node borrows from the remote node.

In hardware implementation, the foregoing sending unit may be a transceiver, and the foregoing determining unit, the querying unit, and the dumping unit may be built in a processor of a node in a hardware form or may be embedded in a processor of a node in a software form. The processor may be a central processing unit (CPU), or a single-chip microcomputer.

Figure 8:
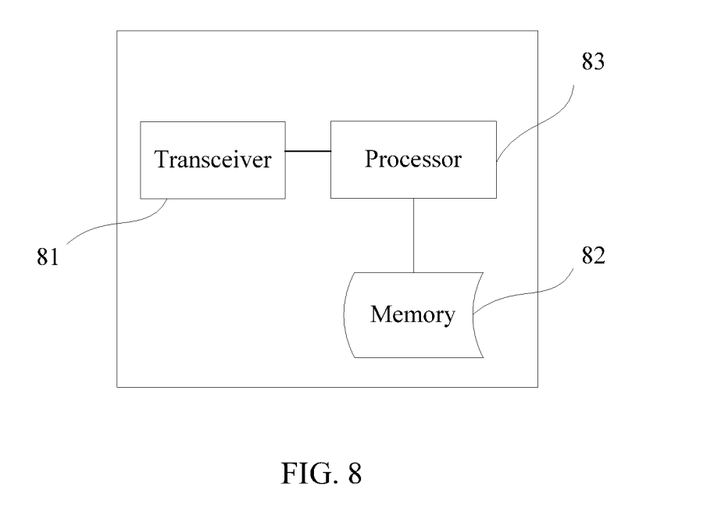
FIG. 8 is a structural block diagram of another local node according to an embodiment of the present disclosure.

FIG. 8 shows a schematic structural diagram of a local node according to this embodiment of the present disclosure. As shown in FIG. 8, the local node includes a transceiver 81, a memory 82, and a processor 83 that is connected to the transceiver 81 and the memory 82 separately. Certainly, the local node may further include general components, such as an antenna and an input/output apparatus. This embodiment of the present disclosure sets no limitation thereto.

The memory 82 stores a set of program code, and the processor 83 is configured to invoke the program code stored in the memory, so as to perform the following operations.

The processor 83 obtains a base address of a memory page that needs to be dumped, and determines, according to the base address of the memory page that needs to be dumped, a node in which the memory page that needs to be dumped is located; when it is determined that the node in which the memory page that needs to be dumped is located is a remote node, the processor 83 queries, according to the base address of the memory page that needs to be dumped, a routing table to obtain routing information of the memory page that needs to be dumped, where the routing table stores routing information corresponding to each memory page, and the routing information includes a base address of the memory page, a remote node address in which the memory page is located, and a physical address of the memory page in the remote node; then, the processor 83 sends, by using the transceiver 81, the routing information that is obtained by querying and is of the memory page that needs to be dumped and dumping signaling to a cloud controller, so that the cloud controller forwards the routing information and the dumping signaling to the remote node in which the memory page that needs to be dumped is located, and then enables the remote node to dump, from memory of the remote node into a hard disk of the remote node according to the dumping signaling and the routing information, data in the memory page that needs to be dumped or dump, from a hard disk of the remote node into memory of the remote node, data in the memory page that needs to be dumped. Herein, the memory of the remote node refers to memory that the local node borrows from the remote node.

Optionally, the processor 83 is configured to determine, according to address space in which the base address of the memory page that needs to be dumped is located, the node in which the memory page that needs to be dumped is located, where the local node prestores address space corresponding to the local node and address space corresponding to the remote node; or the processor 83 is configured to query a page table to obtain identification information corresponding to the base address of the memory page that needs to be dumped, and determine the node in which the memory page that needs to be dumped is located, where the page table stores a base address of each memory page and identification information corresponding to the base address, and the identification information is used to identify a node corresponding to the base address.

Certainly, the node in which the memory page that needs to be dumped is located may also be the local node. When the processor determines that the node in which the memory page that needs to be dumped is located is the local node, the processor 83 dumps, from local memory of the local node into a hard disk of the local node, data in the memory page that needs to be dumped; or dumps, from a hard disk of the local node into local memory of the local node, data in the memory page that needs to be dumped.

Optionally, a memory swap partition may further be set in the hard disk of the local node. In this case, the processor dumps, from the local memory of the local node into the memory swap partition of the hard disk of the local node, the data in the memory page that needs to be dumped, or dumps, from the memory swap partition of the hard disk of the local node into the local memory of the local node, the data in the memory page that needs to be dumped.

Figure 9:
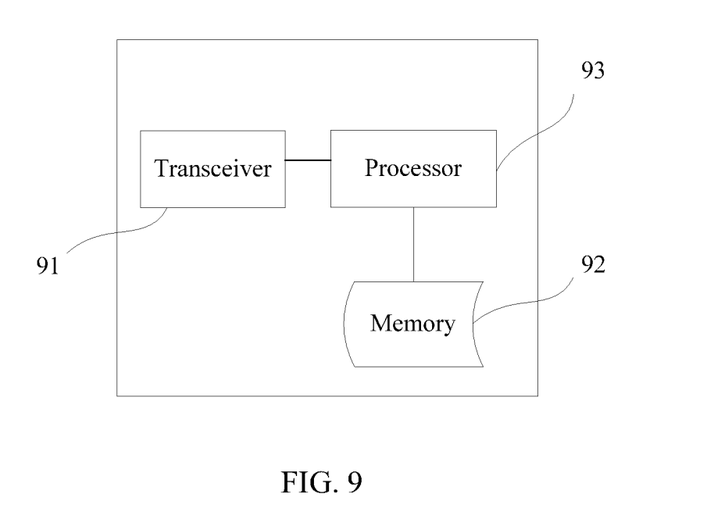
FIG. 9 is a structural block diagram of another remote node according to an embodiment of the present disclosure.

FIG. 9 shows a schematic structural diagram of a remote node according to this embodiment of the present disclosure. As shown in FIG. 9, the remote node includes a transceiver 91, a memory 92, and a processor 93 that is connected to the transceiver 91 and the memory 92 separately. Certainly, the remote node may further include general components, such as an antenna and an input/output apparatus. This embodiment of the present disclosure sets no limitation thereto.

The memory 92 stores a set of program code, and the processor 93 is configured to invoke the program code stored in the memory 92, so as to perform the following operations.

The processor 93 invokes a drive to listen to and receive dumping signaling and routing information that are sent by a cloud controller, and dumps, from memory of the remote node into a hard disk of the remote node according to the dumping signaling and the routing information that are received, data in the memory page that needs to be dumped, or dumps, from a hard disk of the remote node into memory of the remote node, data in the memory page that needs to be dumped. The routing information includes a base address of a memory page that needs to be dumped, a remote node address in which the memory page is located, and a physical address of the memory page in the remote node.

Optionally, a remote memory swap partition is set in the hard disk of the remote node. In this case, the processor 93 can dump, from the memory of the remote node into the remote memory swap partition of the hard disk of the remote node, the data in the memory page that needs to be dumped; or dump, from the remote memory swap partition of the hard disk of the remote node into the memory of the remote node, the data in the memory page that needs to be dumped. Herein, the memory of the remote node refers to memory that the local node borrows from the remote node.

Compared with the prior art, in this embodiment of the present disclosure, there is no need to occupy a transmission channel to transmit data in a memory of a remote memory to a local node, and there is also no need to reserve, in memory of the local node, space for the data that is in the remote memory page and is transmitted back. In this way, a running speed of a system can be improved, and power consumption can be reduced. In addition, a process of the method provided in this embodiment of the present disclosure is simple, and there is no need to modify memory management of a node.

Figure 10:
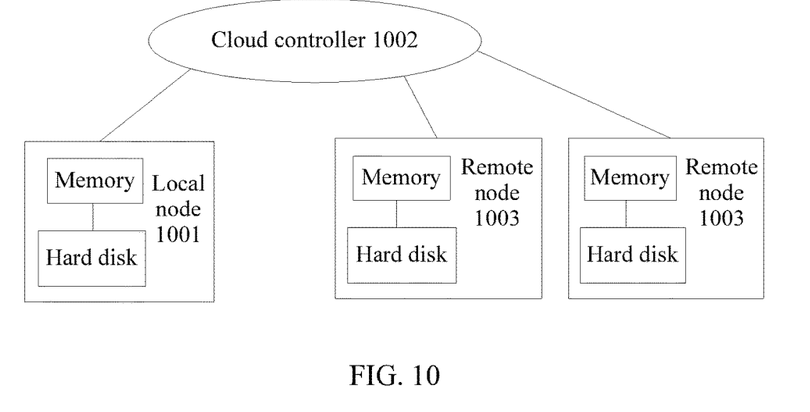
FIG. 10 is a schematic structural diagram of a system according to an embodiment of the present disclosure.

This embodiment of the present disclosure further provides a system. As shown in FIG. 10, the system includes a local node 1001, a cloud controller 1002, and a remote node 1003.

The local node 1001 obtains a base address of a memory page that needs to be dumped, and determines, according to the base address of the memory page that needs to be dumped, a node in which the memory page that needs to be dumped is located; when it is determined that the node in which the memory page that needs to be dumped is located is the remote node 1003, queries, according to the base address of the memory page that needs to be dumped, a routing table to obtain routing information of the memory page that needs to be dumped, where the routing table stores routing information corresponding to each memory page, and the routing information includes a base address of the memory page, a remote node address in which the memory page is located, and a physical address of the memory page in the remote node; and sends the routing information of the memory page that needs to be dumped and dumping signaling to the cloud controller 1002.

The cloud controller 1002 is configured to receive the routing information of the memory page that needs to be dumped and the dumping signaling that are sent by the local node 1001, and forward the routing information of the memory page that needs to be dumped and the dumping signaling to the remote node 1003.

The remote node 1003 invokes a drive to listen to and receive the dumping signaling and the routing information that are sent by the cloud controller 1002, where the routing information includes the base address of the memory page that needs to be dumped, a remote node address in which the memory page is located, and a physical address of the memory page in the remote node, and dumps, from memory of the remote node into a hard disk of the remote node according to the dumping signaling and the routing information, data in the memory page that needs to be dumped, or dumps, from a hard disk of the remote node into memory of the remote node, data in the memory page that needs to be dumped. Herein, the memory of the remote node refers to memory that the local node borrows from the remote node.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A remote memory swapping method, comprising:
   obtaining, by a local node, a base address of a memory page that needs to be dumped;
   determining, according to the base address of the memory page that needs to be dumped, a node in which the memory page that needs to be dumped is located;
   querying, by the local node according to the base address of the memory page that needs to be dumped, a routing table to obtain routing information of the memory page that needs to be dumped when it is determined that the node in which the memory page that needs to be dumped is located is a remote node, wherein the routing table stores routing information corresponding to each memory page, and the routing information comprises a base address of the memory page, a remote node address in which the memory page is located, and a physical address of the memory page in the remote node; and
   sending, by the local node, the routing information of the memory page that needs to be dumped and dumping signaling to a cloud controller such that the cloud controller forwards the routing information of the memory page that needs to be dumped and the dumping signaling to the remote node in which the memory page that needs to be dumped is located.

2. The method according to claim 1, wherein the local node pre-stores address space corresponding to the local node and address space corresponding to the remote node, wherein determining, by the local node according to the base address of the memory page that needs to be dumped, the node in which the memory page that needs to be dumped is located comprises determining, by the local node according to address space in which the base address of the memory page that needs to be dumped is located, the node in which the memory page that needs to be dumped is located.

3. The method according to claim 1, wherein a page table stores a base address of each memory page and identification information corresponding to the base address, and the identification information is used to identify a node corresponding to the base address, wherein determining, by the local node according to the base address of the memory page that needs to be dumped, the node in which the memory page that needs to be dumped is located comprises:
   querying, by the local node, the page table to obtain identification information corresponding to the base address of the memory page that needs to be dumped; and
   determining, according to the obtained identification information, the node in which the memory page that needs to be dumped is located.

4. The method according to claim 1, wherein when it is determined that the node in which the memory page that needs to be dumped is located is the local node, the method further comprises dumping, by the local node from local memory of the local node into a hard disk of the local node, data in the memory page that needs to be dumped.

5. The method according to claim 1, wherein when it is determined that the node in which the memory page that needs to be dumped is located is the local node, the method further comprises dumping, by the local node from a hard disk of the local node into local memory of the local node, data in the memory page that needs to be dumped.

6. The method according to claim 4, wherein a memory swap partition is set in the hard disk of the local node, and wherein dumping, by the local node from the local memory of the local node into the hard disk of the local node, the data in the memory page that needs to be dumped comprises dumping, by the local node from the local memory of the local node into the memory swap partition of the hard disk of the local node, the data in the memory page that needs to be dumped.

7. The method according to claim 5, wherein a memory swap partition is set in the hard disk of the local node, and wherein dumping, by the local node from the hard disk of the local node into the local memory of the local node, the data in the memory page that needs to be dumped comprises dumping, from the memory swap partition of the hard disk of the local node into the local memory of the local node, the data in the memory page that needs to be dumped.

8. A remote memory swapping method, comprising:
invoking, by a remote node, a drive to listen to and receive dumping signaling and routing information that are sent by a cloud controller, wherein the routing information comprises a base address of a memory page that needs to be dumped, a remote node address in which the memory page that needs to be dumped is located, and a physical address of the memory page that needs to be dumped and is in the remote node;
dumping, by the remote node from memory of the remote node into a hard disk of the remote node according to the dumping signaling and the routing information, data in the memory page that needs to be dumped when the dumping signaling is swap out dumping signaling; and
dumping, by the remote node from a hard disk of the remote node into memory of the remote node according to the dumping signaling and the routing information, data in the memory page that needs to be dumped when the dumping signaling is swap in dumping signaling.

9. The method according to claim 8, wherein a remote memory swap partition is set in the hard disk of the remote node, wherein dumping, from the memory of the remote node into the hard disk of the remote node, the data in the memory page that needs to be dumped comprises dumping, from the memory of the remote node into the remote memory swap partition of the hard disk of the remote node, the data in the memory page that needs to be dumped, and wherein dumping, from the hard disk of the remote node into the memory of the remote node, the data in the memory page that needs to be dumped comprises dumping, from the remote memory swap partition of the hard disk of the remote node into the memory of the remote node, the data in the memory page that needs to be dumped.

10. A local node, comprising:
a transceiver;
a processor; and
a memory, wherein the memory has a set of program code stored thereon, that when executed by the processor, cause the processor to:
obtain a base address of a memory page that needs to be dumped;
determine, according to the base address of the memory page that needs to be dumped, a node in which the memory page that needs to be dumped is located; and
query, according to the base address of the memory page that needs to be dumped, a routing table to obtain routing information of the memory page that needs to be dumped when it is determined that the node in which the memory page that needs to be dumped is located is a remote node, wherein the routing table stores routing information corresponding to each memory page, and the routing information comprises a base address of the memory page, a remote node address in which the memory page is located, and a physical address of the memory page in the remote node, and
wherein the transceiver is configured to send the routing information that is obtained by querying by the processor and is of the memory page that needs to be dumped and dumping signaling to a cloud controller such that the cloud controller forwards the routing information that is obtained by querying and the dumping signaling to the remote node in which the memory page that needs to be dumped is located.

11. The local node according to claim 10, wherein the local node pre-stores address space corresponding to the local node and address space corresponding to the remote node, and wherein the set of program code further cause the processor to determine, according to address space in which the base address of the memory page that needs to be dumped is located, the node in which the memory page that needs to be dumped is located.

12. The local node according to claim 10, wherein a page table stores a base address of each memory page and identification information corresponding to the base address, and the identification information is used to identify a node corresponding to the base address, wherein the set of program code further cause the processor to:
query the page table to obtain identification information corresponding to the base address of the memory page that needs to be dumped; and
determine the node in which the memory page that needs to be dumped is located.

13. The local node according to claim 10, wherein the set of program code further cause the processor to dump, from local memory of the local node into a hard disk of the local node, data in the memory page that needs to be dumped when determining that the node in which the memory page that needs to be dumped is located is the local node.

14. The local node according to claim 10, wherein the set of program code further cause the processor to dump, from a hard disk of the local node into local memory of the local node, data in the memory page that needs to be dumped when determining that the node in which the memory page that needs to be dumped is located is the local node.

15. The local node according to claim 13, wherein a memory swap partition is set in the hard disk of the local node, and wherein the set of program code further cause the processor to dump, from the local memory of the local node into the memory swap partition of the hard disk of the local node, the data in the memory page that needs to be dumped.

16. The local node according to claim 14, wherein a memory swap partition is set in the hard disk of the local node, and wherein the set of program code further cause the processor to dump, from the memory swap partition of the hard disk of the local node into the local memory of the local node, the data in the memory page that needs to be dumped.

17. A remote node, comprising:
a processor; and
a memory, wherein the memory has a set of program code stored thereon, that when executed by the processor, cause the processor to:
invoke a drive to listen to and receive dumping signaling and routing information that are sent by a cloud controller, wherein the routing information comprises a base address of a memory page that needs to be dumped, a remote node address in which the memory page that needs to be dumped is located, and a physical address of the memory page that needs to be dumped and is in the remote node;
dump, from memory of the remote node into a hard disk of the remote node according to the dumping signaling and the routing information that are received, data in the memory page that needs to be dumped when the dumping signaling is swap out dumping signaling; and
dump, from a hard disk of the remote node into memory of the remote node according to the dumping signaling and the routing information that are received, data in the memory page that needs to be dumped when the dumping signaling is swap in dumping signaling.

18. The remote node according to claim 17, wherein a remote memory swap partition is set in the hard disk of the remote node, and wherein the set of program code further cause the processor to:
dump, from the memory of the remote node into the remote memory swap partition of the hard disk of the remote node, the data in the memory page that needs to be dumped when the dumping signaling is swap out dumping signaling; and
dump, from the remote memory swap partition of the hard disk of the remote node into the memory of the remote node, the data in the memory page that needs to be dumped when the dumping signaling is swap in dumping signaling.

19. A system, comprising:
a local node;
a cloud controller; and
a remote node;
wherein the local node is configured to:
obtain a base address of a memory page that needs to be dumped;
determine, according to the base address of the memory page that needs to be dumped, a node in which the memory page that needs to be dumped is located;
query, according to the base address of the memory page that needs to be dumped, a routing table to obtain routing information of the memory page that needs to be dumped when it is determined that the node in which the memory page that needs to be dumped is located is a remote node, wherein the routing table stores routing information corresponding to each memory page, and the routing information comprises a base address of the memory page, a remote node address in which the memory page is located, and a physical address of the memory page in the remote node; and
send the routing information of the memory page that needs to be dumped and dumping signaling to a cloud controller,
wherein the cloud controller is configured to:
receive routing information that is sent by the local node and is of a memory page that needs to be dumped; and
send the remote node the routing information of the memory page that needs to be dumped, and
wherein the remote node is configured to:
invoke a drive to listen to and receive dumping signaling and routing information that are sent by a cloud controller, wherein the routing information comprises a base address of a memory page that needs to be dumped, a remote node address in which the memory page that needs to be dumped is located, and a physical address of the memory page that needs to be dumped and is in the remote node;
dumping, from memory of the remote node into a hard disk of the remote node according to the dumping signaling and the routing information, data in the memory page that needs to be dumped when the dumping signaling is swap out dumping signaling; and
dumping, from a hard disk of the remote node into memory of the remote node according to the dumping signaling and the routing information, data in the memory page that needs to be dumped when the dumping signaling is swap in dumping signaling.

* * * * *

UNITED STATES PATENT AND TRADEMARK OFFICE
CERTIFICATE OF CORRECTION

PATENT NO. : 10,013,165 B2
APPLICATION NO. : 15/056242
DATED : July 3, 2018
INVENTOR(S) : Qianlong Zhang et al.

It is certified that error appears in the above-identified patent and that said Letters Patent is hereby corrected as shown below:

On the Title Page

Item (30), Line 1: "201310391114" should be "201310391114.9"

Signed and Sealed this
Twenty-eighth Day of August, 2018

Andrei Iancu
*Director of the United States Patent and Trademark Office*